(12) United States Patent
Riordan et al.

(10) Patent No.: US 9,472,819 B2
(45) Date of Patent: Oct. 18, 2016

(54) WARMING FEATURE FOR AIRCRAFT FUEL CELLS

(75) Inventors: Conor Riordan, Grand Rapids, MI (US); Dustin L. Kaap, Rockford, IL (US); Mallika Gummalla, Longmeadow, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 834 days.

(21) Appl. No.: 13/457,850

(22) Filed: Apr. 27, 2012

(65) Prior Publication Data

US 2013/0288082 A1    Oct. 31, 2013

(51) Int. Cl.
  *H01M 12/00* (2006.01)
  *H01M 8/04* (2016.01)
  *H01M 8/10* (2016.01)
  *B64D 41/00* (2006.01)

(52) U.S. Cl.
  CPC ..... *H01M 8/04014* (2013.01); *H01M 8/04029* (2013.01); *H01M 8/0432* (2013.01); *H01M 8/04037* (2013.01); *H01M 8/04253* (2013.01); *H01M 8/04723* (2013.01); *H01M 8/04768* (2013.01); *B64D 2041/005* (2013.01); *H01M 2008/1095* (2013.01); *Y02E 60/50* (2013.01); *Y02T 90/36* (2013.01)

(58) Field of Classification Search
  CPC .............. H01M 8/04014; H01M 8/04029; H01M 8/04037; H01M 8/04253; H01M 8/04723; H01M 8/04768; H01M 8/0432; H01M 2008/1095; B64D 2041/005; Y02T 90/36; Y02E 60/50
  USPC ................................... 428/9, 442, 434, 436
  See application file for complete search history.

(56) References Cited

U.S. PATENT DOCUMENTS

| | | | |
|---|---|---|---|
| 6,955,861 B2 | 10/2005 | Yoshizawa et al. | |
| 7,169,493 B2 | 1/2007 | Molter et al. | |
| 7,618,726 B2 | 11/2009 | Ogawa | |
| 7,901,823 B2 | 3/2011 | Hayashi et al. | |
| 8,034,500 B2 | 10/2011 | Desrosiers et al. | |
| 2005/0112418 A1* | 5/2005 | Roberts et al. | ................. 429/13 |
| 2005/0181246 A1* | 8/2005 | Nakaji | ............................. 429/13 |
| 2008/0020250 A1* | 1/2008 | Schuetz | ................... B01J 20/20 96/108 |

\* cited by examiner

*Primary Examiner* — Gary Harris
(74) *Attorney, Agent, or Firm* — Cantor Colburn LLP

(57) ABSTRACT

A system and method for warming a fuel cell on an aircraft, the system includes at least one fuel cell. The fuel cell includes an anode and a cathode for creating thermal and electrical energy. A temperature sensor measures a first temperature of the fuel cell. A control unit is coupled to the temperature sensor. The control unit increases the first temperature to a second temperature in response to the first temperature being at least equal to a selected temperature threshold. Increasing of the first temperature is indicative of the control unit operating in a warming mode. The second temperature is higher than the selected temperature threshold.

8 Claims, 5 Drawing Sheets

WARMING FEATURE FOR AIRCRAFT FUEL CELLS

BACKGROUND OF THE INVENTION

This subject matter disclosed herein relates to a fuel cell system provided for use on board an aircraft and, in particular, to temperature regulation of such a fuel cell system.

Fuel cells generate electrical energy with low emissions and a high level of efficiency. The power generated by an aircraft fuel cell may be utilized to supplement or replace the primary power generation system. An aircraft fuel call may also be utilized for emergency power generation to supplement or replace an aircraft ram air turbine.

Thermal regulation is an important consideration for fuel cells utilized in aircraft emergency power generation systems. Due to the immediate demand for power in an emergency situation, delayed start times caused by a cold fuel cell are unacceptable. If a warming feature is not available for the fuel cell, a supplemental battery system will be necessary to provide power until the fuel cell has warmed to its operational temperature. The use of a battery system is both heavy and expensive.

Conventional fuel cells include an anode region and a cathode region separated by an electrolyte. When the fuel cell is operated, a fuel, for example hydrogen, is supplied to the anode side and an oxygen-containing oxidant, such as air, is supplied to the cathode side. In fuel cells where the electrolyte is a polymer electrolyte membrane (PEM), the hydrogen molecules react at an anode catalyst in the anode region to form positively charged hydrogen ions (H+) and transfer electrons to the electrode. The H+ ions, which are formed in the anode region, then diffuse through the electrolyte to the cathode where they react, at a cathode catalyst, with the oxygen supplied to the cathode and the electrons that are transferred to the cathode by way of an external circuit, forming water.

BRIEF SUMMARY OF THE INVENTION

According to an embodiment of the invention, a system is provided for warming a fuel cell on an aircraft, the system including at least one fuel cell. The fuel cell includes an anode and a cathode for creating thermal and electrical energy. A temperature sensor measures a first temperature of the fuel cell. A control unit is coupled to the temperature sensor. The control unit increases the first temperature to a second temperature in response to the first temperature being at least equal to a selected temperature threshold. Increasing of the first temperature is indicative of the control unit operating in a warming mode. The second temperature is higher than the selected temperature threshold.

According to an alternate embodiment of the invention, a method of operating a fuel cell on an aircraft is provided wherein the fuel cell includes a membrane between an anode and a cathode and a sensor positioned to measure the temperature of the fuel cell. The method includes sensing the temperature of the fuel cell. If the temperature sensed is above a selected threshold, the fuel cell is operated in a first mode. If the temperature sensed is equal to or less than the selected threshold, the fuel cell is operated in a second mode.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

It has been discovered that a polymer electrolyte membrane (PEM) fuel cell shows high performance at temperatures between about 60° C. (333 Kelvin) and about 80° C. (353 Kelvin). Performance of the fuel cell is reduced at lower temperatures because the reaction activation and ion conductance of the electrolyte membrane are decreased. Particularly, if the ambient temperature falls below 0° C. (273 Kelvin) the temperature of the fuel cell stack may also fall below 0° C. (273 Kelvin). This can cause the water used for electrode activation and hydrogen ion transfer in an electrolyte membrane to freeze, resulting in degraded performance. For this reason, when a fuel cell starts at a low temperature, it is very important to raise the temperature to 0° C. (273 Kelvin) or greater in order to warm the inside of the fuel cell stack and melt any frozen water.

Freezing of the water inside a fuel cell can occur often when the fuel cell is contained in a region of an aircraft that is not temperature controlled. Hereinafter, the fuel cell will be considered in an "idle" state when not generating power. A fuel cell on an aircraft may be idle when the aircraft is in-flight, taxiing, long-term parking, or undergoing service. Atmospheric temperature variations resulting from flight or environmental conditions, such as take-off and landing, may cause freezing and thawing cycles to occur within an idle fuel cell, thereby degrading the performance and life of the fuel cell. The critical layer of the fuel cell, which consists of the membrane and electrodes, may retain liquid water even below 0° C. (273 Kelvin). The electrodes are able to retain water up to approximately −10° C. (263 Kelvin) due to a lowered freezing point associated with capillary effects, and the membrane may have some "bound" water with a freezing point as low as −40° C. (233 Kelvin). As such, a low temperature for keeping the fuel cell warm to enable rapid startup and minimal loss of performance associated with freeze-thaw cycles is chosen to be approximately −10° C. (263 Kelvin). However, as fuel cell technology advancements are made, the coldest warming temperature could be as low as −30° C. (243 Kelvin).

Figure 1:
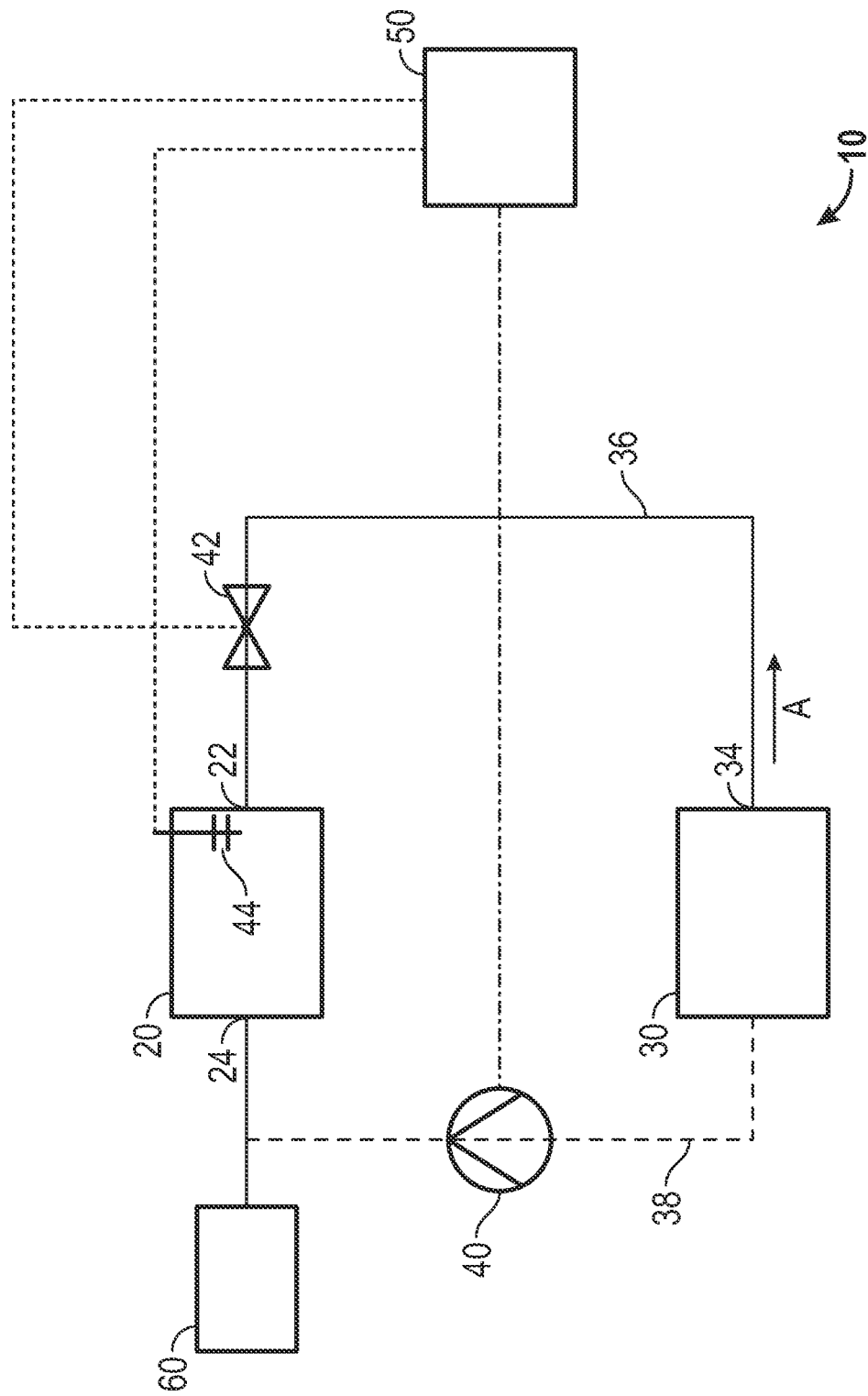
FIG. 1 is a schematic drawing of a thermal control subsystem of a fuel cell according to an embodiment of the invention.

Referring to the FIG. 1, a thermal control subsystem 10 for a fuel cell system located on an aircraft is illustrated. During operation, a fuel cell stack 20 and the associated subsystems in direct or fluid communication with the fuel cell stack 20, are at an elevated temperature. For example, the operating temperature of a proton exchange membrane (PEM) fuel cell is commonly in the range of between about 60° C. (333 Kelvin) and about 85° C. (358 Kelvin). Therefore, the various subsystems in direct or fluid communication with the fuel cell stack 20 are similarly at an elevated temperature when the fuel cell system becomes idle. When the fuel cell system is in an idle state, assuming a sub-freezing ambient temperature, the various subsystems will cool rapidly. After a sufficiently long period of time, the fuel cell stack 20 will eventually cool to the sub-freezing ambient temperature. Positioned adjacent to or within the fuel cell stack 20 is a temperature sensor 44 connected to a control device 50 for monitoring the temperature of the stack 20. When the temperature of the idle fuel cell stack 20 falls below a selected threshold, the control device 50 will shift the operation of the fuel cell system from an idle first mode to a second warming mode. An exemplary selected temperature threshold may be in the range of between about 4° C. (277 Kelvin) and −10° C. (263 Kelvin). More specifically, an exemplary selected temperature may be 0° C. (273 Kelvin). The fuel cell stack may include a series of fuel cells stacked and held together by pressure plates. The temperature of the fuel cell stack 20 may vary from fuel cell to fuel cell. Typically, during a cooling process, the ends of the fuel cell stack 20 nearest the pressure plates cool more quickly than the center of the stack 20. Because of this, the temperature sensor 44 used to drive the control system may be arranged to measure the temperature of the coolest part of the fuel cell stack 20, such as at the fuel cells adjacent the pressure plates for example.

Multiple methods exist for warming a fuel cell stack 20 in the second mode whereby a gas or a liquid is circulated through system 10. In an embodiment, as shown in FIG. 1, a thermal control subsystem 10 increases the temperature of a fuel cell stack 20 using warm air from another aircraft subsystem. A warm air supply 30 is fluidly connected to an inlet 22 of the fuel cell stack 20 by a conduit 36. Exemplary sources that may act as air supply 30 include the airplane's air supply management system, cabin air, and engine bleed air. The temperature of the air provided by the air supply 30 may be up to about 95° C. (368 Kelvin) depending on the source of the air. As the warm air A passes through the fuel cell stack 20, thermal energy is transferred from the air A to the fuel cell stack 20. The air A then exits through outlet 24 of the fuel cell stack 20 and is released in area 60, such as a within another section of the aircraft or to the atmosphere, for example. In another embodiment, the air A may be returned to the air supply 30 from which it was taken by a conduit 38. Disposed along the fluid path between the outlet 34 of the air supply 30 and the inlet 22 of the fuel cell stack 20 is a valve 42 operable between an open and a closed position.

In one embodiment, a pump 40 is located along the conduit 38 for circulating the air from the fuel cell stack 20 back to the air supply 30. The pump 40 and the valve 42 are connected to a control device 50. Once a temperature sensor 44 determines that the temperature of the fuel cell stack 20 is below a selected threshold, the control device 50 will begin to operate in the second mode by opening the valve 42, so that air will flow from the air supply 30 to the fuel cell stack 20. In addition, the control device 50 may run the pump 40 to circulate the cool air exiting the fuel cell stack 20 back to the air supply 30. In one embodiment, the warm air A is circulated around the outside of the fuel cell stack 20 rather than through it. For fuel cells constructed with porous bipolar plate technology, circulating warming air around the fuel cell, as opposed to through it, will prevent dehydration of the membrane. For fuel cells constructed with a solid bipolar plate technology, where the coolant loop is fluidly isolated from the membrane electrode assembly, the warm air may be circulated through the coolant channels of the fuel cell. Both solid plate and porous plate technology fuel cells may be warmed by circulating warm air around the outside of the fuel cell stack 20.

Figure 2:
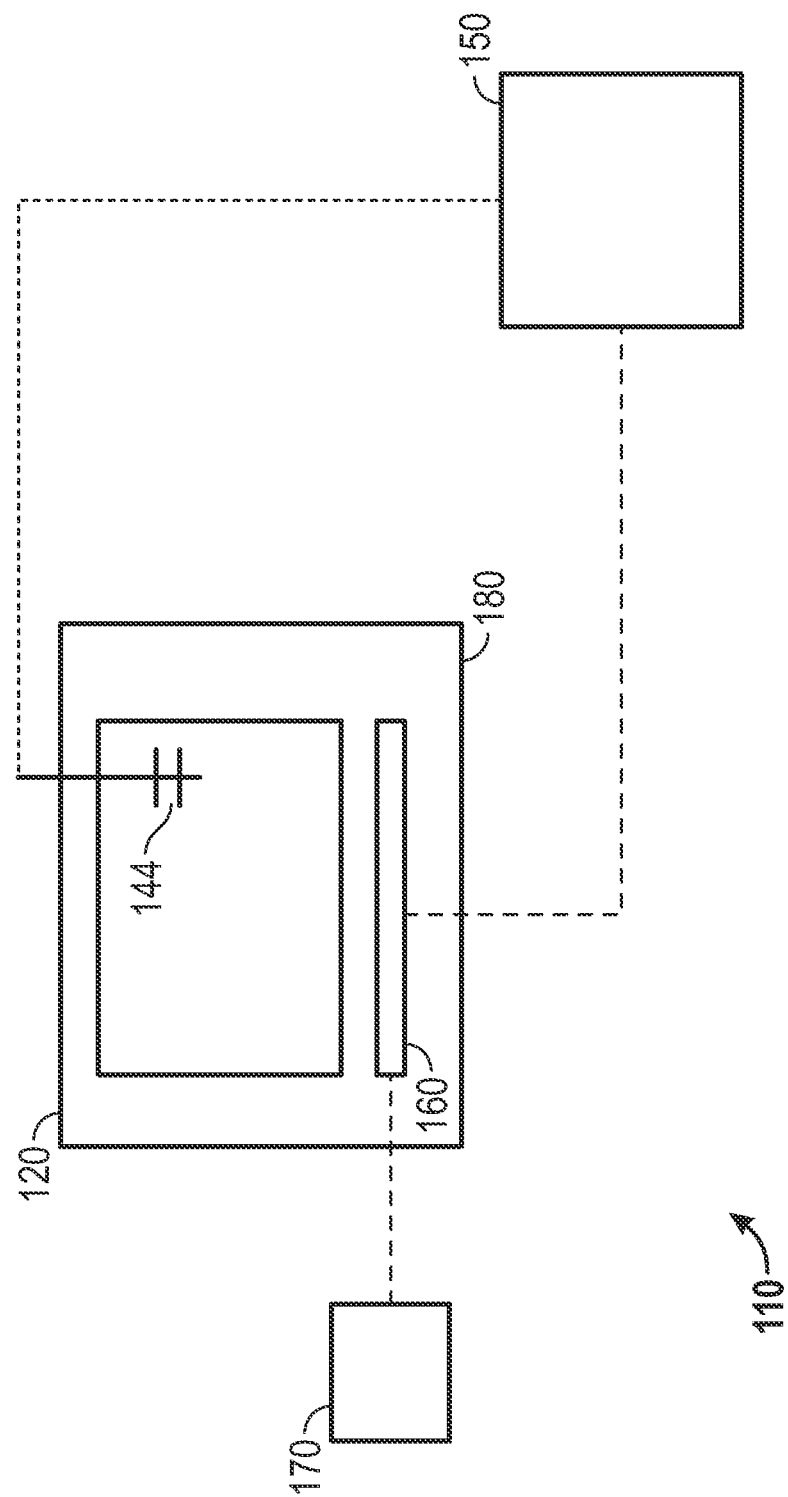
FIG. 2 is a schematic drawing of an alternate thermal control subsystem of a fuel cell according to an embodiment of the invention.

Referring now to FIG. 2, in yet another embodiment, a thermal control subsystem 110 warms a fuel cell stack 120 using one or more resistive electrical elements 160. The resistive electrical element 160 may be positioned adjacent the fuel cell stack 120 or alternately may be embedded within the end plates or pressure plates of the fuel cell stack 120. In one embodiment, the resistive electrical element 160 is a heater. In one embodiment, thermal insulation 180, such as an insulating jacket for example, surrounds the fuel cell stack 120. The thermal insulation will slow the cooling of the idle fuel cell stack 120 by retaining some of the heat generated during operation. The thermal insulation 180 illustrated may be used in conjunction with any of the thermal control subsystems disclosed herein. When a temperature sensor 144 connected to the fuel cell stack 120 determines that the temperature of the fuel cell stack 120 has fallen below a selected threshold, the control device 150 switches from a first mode to a second warming mode. In the second warming mode, the control device 150 sends a signal to activate the resistive electrical element 160. In one embodiment, power is provided to the resistive electrical element 160 by a power source 170. The power source 170 is the electrical grid of the aircraft. In another embodiment, the power source 170 is a battery. In yet another embodiment, when the aircraft is parked, ground power may be used to power the resistive electrical element 160.

Figure 3:
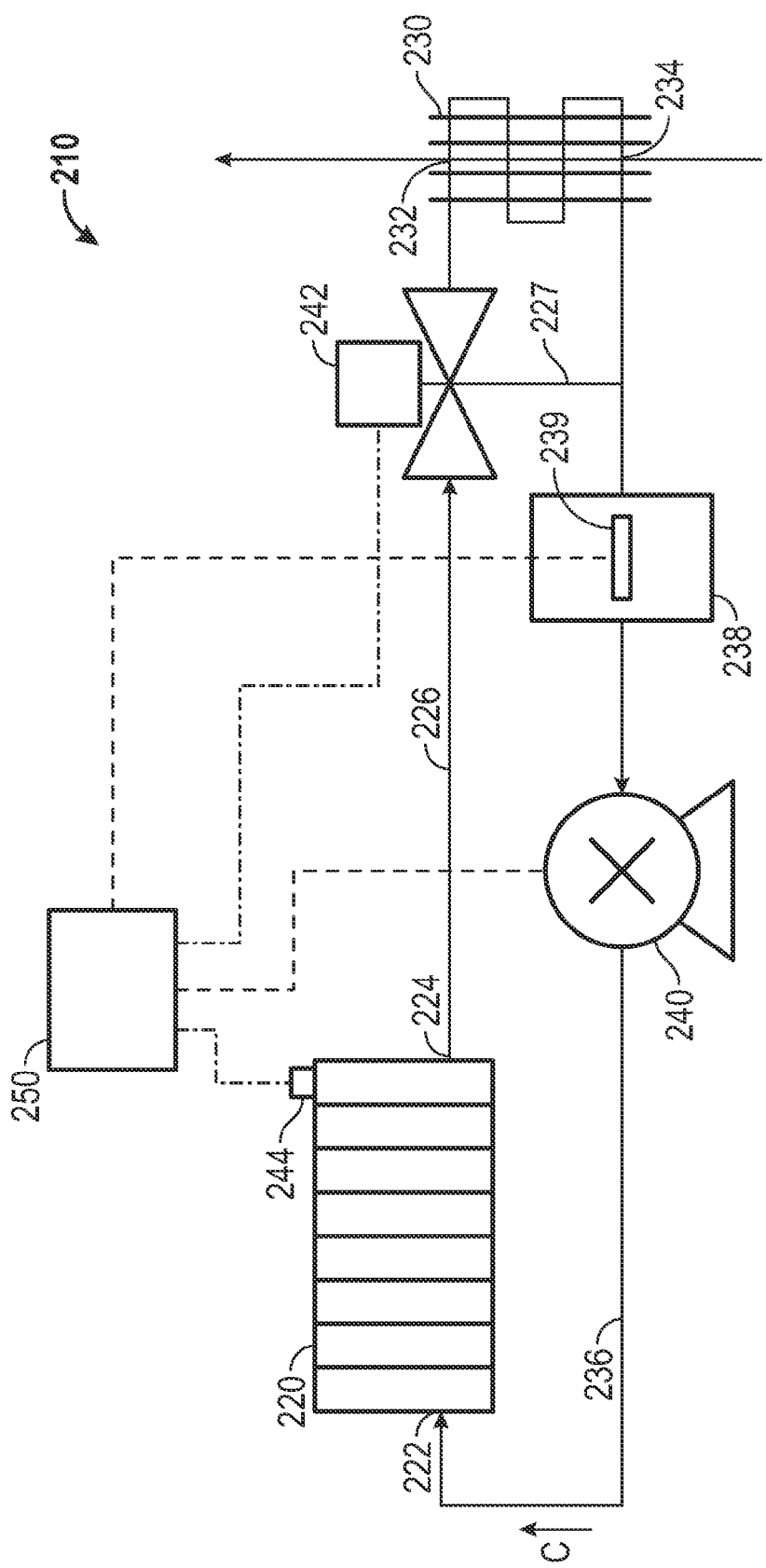
FIG. 3 is a schematic drawing of an alternate thermal control subsystem of a fuel cell according to an embodiment of the invention.

Referring now to the exemplary thermal control subsystem 210 of FIG. 3, an outlet 224 of a fuel cell stack 220 is fluidly connected to an inlet 232 of a heat exchanger 230 by a first conduit 226. Similarly, a second conduit 236 connects the outlet 234 of the heat exchanger 230 with the inlet 222 of the fuel cell 220 to form a thermal management loop. In one embodiment, a fluid C, such as air or a coolant including water or antifreeze for example, circulates within the thermal management loop. If fluid C is antifreeze, thermal control subsystem 210 may not be applied to porous bipolar plate fuel cells. As illustrated, a control valve 242 is provided along conduit 226 between the outlet 224 of the fuel cell stack 220 and the inlet 232 of the heat exchanger 230. The valve 242 is operable between a first position and a second position to control the circulation of the fluid C within the thermal management loop.

Additionally a bypass conduit 227 connects conduit 226 to conduit 236 adjacent the heat exchanger 230 in order to redirect a flow of fluid. The end of bypass conduit 227 is connected to valve 242. In one embodiment, valve 242 is a three way valve such that when the fuel cell 220 is idle, the flow of fluid C may be redirected through bypass conduit 227, rather than through the heat exchanger 230. The fluid C is circulated by a pump 240 under control of the control device 250. In one embodiment, the fluid C has a temperature generally in the range of between −10° C. (263 Kelvin) and the temperature of the fuel cell 220. If water is used as a coolant fluid, the fluid C temperature would be limited to 0° C. (273 Kelvin). An accumulator 238 may be provided upstream from the pump 240. In one embodiment, a heating device 239, such as a wire mesh heater for example, may be positioned within the accumulator 238 to increase the temperature of the fluid C being circulated to the fuel cell stack 220. The pump 240, the valve 242, and the heating device 239 are operably coupled to the control device 250.

It will be understood by a person of ordinary skill that this thermal management loop uses fluid C to transfer heat to the fuel cell stack 220 from the heating device 239 when the fuel cell 220 is idling. When the fuel cell stack 220 is in normal operation and not idling, this same thermal management loop 210 may serve as a cooling loop that transfers thermal energy from the fuel cell stack 220 to the environment via the heat exchanger 230. When the temperature sensor 244 embedded within the fuel cell stack 220 falls below a selected value, the control device 250 may be programmed to operate the heating device 239 within accumulator 238, causing the fluid C to become heated. Additionally, the control device 250 opens the valve 242 at the end of bypass conduit 227 and activates the pump 240 to circulate the fluid C through the fuel cell stack 220. Circulation of the fluid C will transfer thermal energy from the heating device 239 to the fuel cell stack 220. As the fluid C exits the outlet 224 of the fuel cell stack 220, the cooled fluid C flows through bypass conduit 227 and into the accumulator 238 where the fluid C may be heated by the heating device 239.

In an alternate embodiment, illustrated in FIG. 4, the bypass conduit 227 of thermal management system 210 includes a heat exchanger 229 rather than a heating device 239 while all other components remain substantially the same as the system shown and described with reference to FIG. 3. The heat exchanger 229 is located in a temperature controlled area of the aircraft, such as in the cabin for example. As the fluid C circulates through the heat exchanger 229, heat from the surrounding air will transfer to the fluid C.

Figure 4:
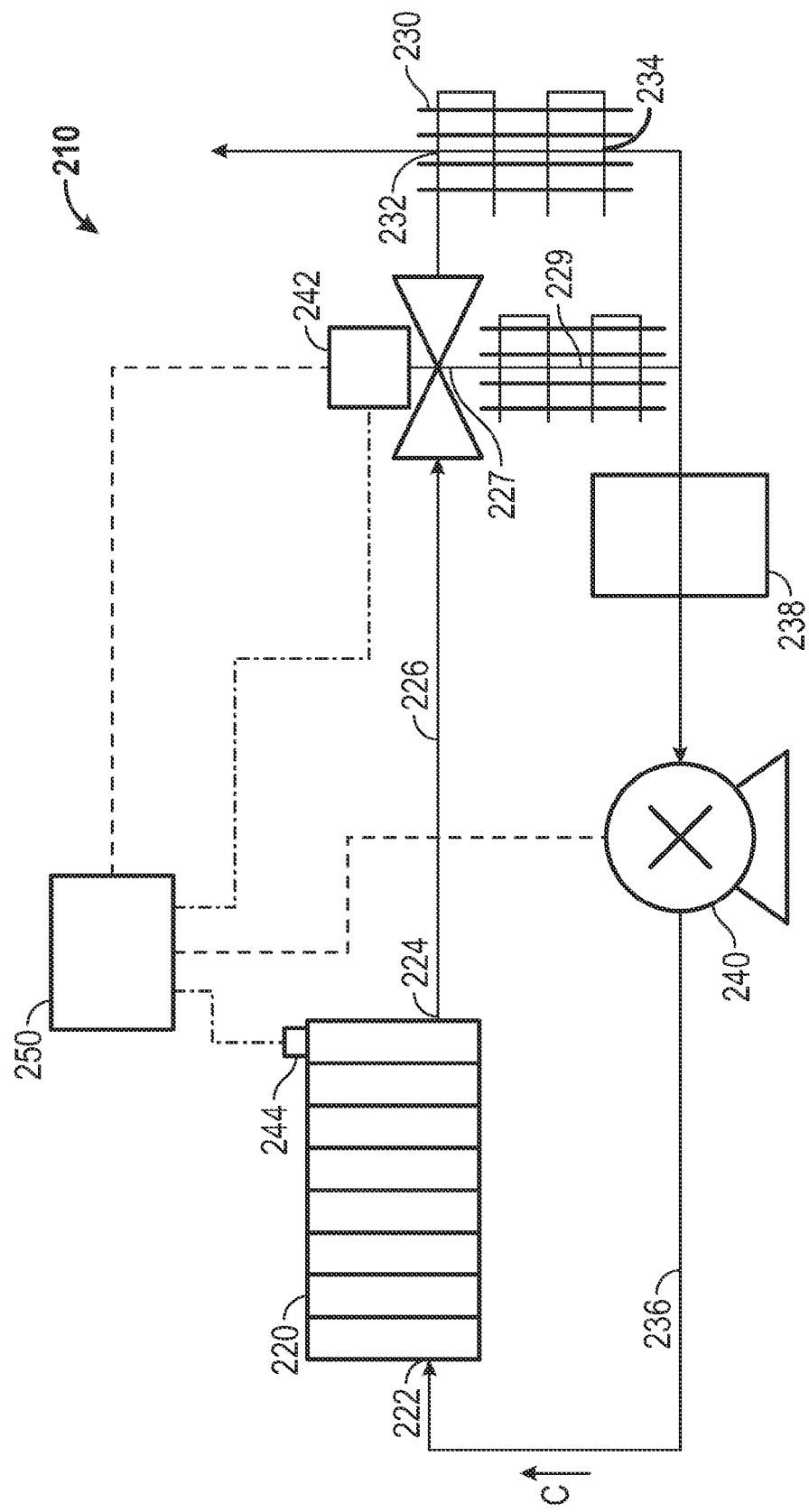
FIG. 4 is a schematic drawing of an alternate thermal control subsystem of a fuel cell according to an embodiment of the invention.
Figure 5:
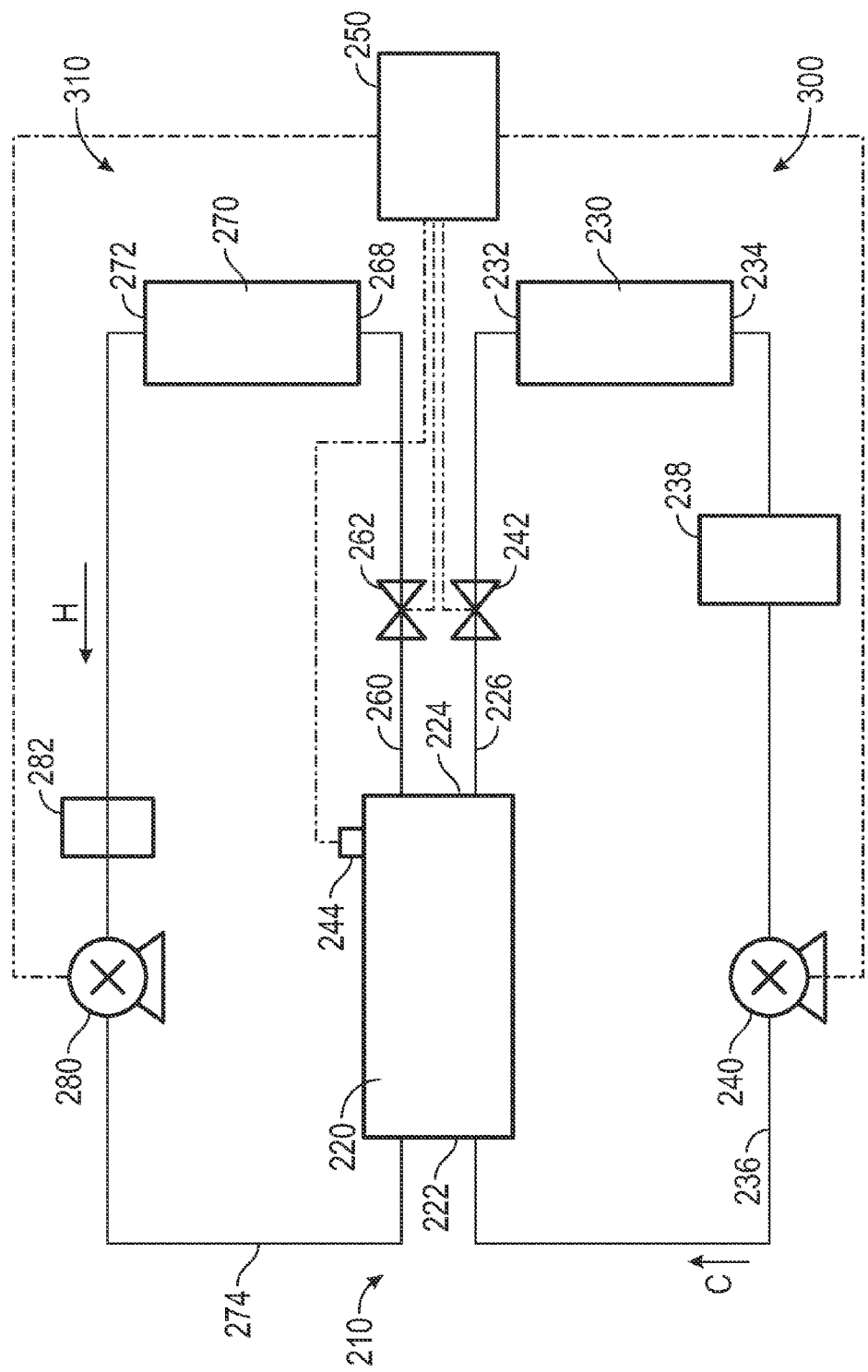
FIG. 5 is a schematic drawing of an alternate thermal control subsystem of a fuel cell according to an embodiment of the invention.

The thermal control subsystem 210 illustrated in FIG. 5 is a variation of the thermal control subsystem of FIG. 4 for warming a fuel cell stack 220. The fuel cell in FIG. 5 includes a dedicated cooling loop 300 and a separate, dedicated heating loop 310. The outlet 224 of the fuel cell stack 220 is fluidly connected to an inlet 268 of a heat exchanger 270 by a first conduit 260. A second conduit 274 connects the outlet 272 of the heat exchanger 270 with the inlet 222 of the fuel cell stack 220 to form a heating loop. In one embodiment, the heat exchanger 270 is located in a temperature controlled area in the aircraft, such as in the cabin for example. A warming fluid H, such as water or air for example, circulates within the heating loop 310. A cooling fluid C, such as water for example, circulates within the cooling loop 300. The heating loop 310 includes a control valve 262 and a pump 280 for circulating the fluid H. The cooling loop 300 includes a control valve 242 and a pump 240 for circulating the fluid C. When the fuel cell 220 is in normal operation and generating heat, control valve 242 of the cooling loop 300 will be open and the control valve 262 of the heating loop 310 will be closed. Opening of control valve 242 and operation of pump 240 will circulate the cooling fluid C and will remove heat from the fuel cell 220.

During normal operation, heat from the fuel cell 220 is released to the ambient atmosphere through conduit 226 and the heat exchanger 230. In the illustrated embodiment, the cooling loop 300 does not include a bypass conduit, or a heating device disposed within the accumulator 238. When the fuel cell 220 is idling and above a selected temperature threshold, both control valves 242, 262 are closed such that neither the heating loop 310 nor the cooling loop 300 is operating. When the temperature sensor 244 detects that the temperature of the fuel cell stack 220 is below a selected threshold, the control device 250 will initiate the operation of the heating loop 310 by opening control valve 262 and miming pump 280 to circulate the fluid H through the fuel cell 220. As the cooled fluid H exits the outlet 224 of the fuel cell stack 220, it passes through heat exchanger 270, where heat is transferred to the fluid H from the surrounding environment. In embodiments where fluid H is water, the heating loop 310 may additionally include an accumulator 282.

In another embodiment, the fuel cell stack of any of the prior embodiments may be warmed by operating the fuel cell at a low or minimum load. The heat produced as a byproduct of the electrochemical process of the fuel cell warms the fuel cell stack to a temperature above the minimum threshold. To warm the fuel cell stack using this method for long periods of time, a large supply source of both hydrogen and oxygen is required.

For any of the disclosed embodiments, when the fuel cell is idle, power is required to operate the associated devices, such as a control device, a pump, or a heating device for example. Because the fuel cell is not generating power when it is idle, the power for the associated devices is supplied by an alternate source. Exemplary power sources include a battery, the power grid of the aircraft, ground power is the aircraft is parked, and any other means known to a person skilled in the art.

Any of the embodiments of the invention discussed above may be applied to a fuel cell system of an aircraft individually or in combination with any of the other embodiments. For example, when the fuel cell system operates in a second mode, the fuel cell may operate at a minimum load and include a resistive electrical heating element. When applied together to the fuel cell system, the resistive electrical heating element may be driven using the electrical power generated by the fuel cell stack. In addition, a thermal insulation, such as an insulating jacket, may surround any of the fuel cell stacks in the previously described thermal control systems.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A system for warming a fuel cell on an aircraft, comprising: at least one fuel cell including an anode and a cathode for creating electrical and thermal energy by an electrochemical reaction; a thermal control subsystem including a cooling loop operably coupled to an inlet and an outlet of the fuel cell and a heating loop operably coupled to the inlet and the outlet of the fuel cell, the cooling loop being separate from the heating loop; at least one temperature sensor for measuring a first temperature of the at least one fuel cell; and a control unit electrically coupled to the at least one temperature sensor, the control unit being configured for increasing the first temperature to a second temperature in response to the first temperature being at least equal to a selected temperature threshold; wherein the increasing of the first temperature is indicative of the control unit operating the fuel cell in a warming mode, and wherein the second temperature is higher than the selected temperature threshold wherein the control unit is configured to increase the temperature while the aircraft is in flight, on ground, and during aircraft parking.

2. The system according to claim 1, wherein the selected temperature threshold is generally in the range of between about 4° C. and about −10° C.

3. The system according to claim 2, wherein the selected temperature threshold is generally about 0° C.

4. The system according to claim 1, wherein the heating loop includes a warm fluid supply arranged in fluid communication with the fuel cell for heating the environment of the fuel cell.

5. The subsystem according to claim 4, wherein the warm fluid is supplied from one or more of an aircraft air supply management system, a cabin air system of the aircraft, or engine bleed air.

6. The system according to claim 4, wherein the temperature of the warm fluid is generally in the range of between about −10° C. and about 95° C.

7. The system according to claim 1, wherein the heating loop further comprises a heat exchanger in fluid communication with the fuel cell for heating the environment of the fuel cell.

8. The system according to claim 1, wherein power for operating the fuel cell in the warming mode is supplied by one of an electrical grid of the aircraft, a ground power source, or a battery.

* * * * *